US012794380B2

(12) United States Patent
Miyazaki

(10) Patent No.: US 12,794,380 B2
(45) Date of Patent: Nov. 10, 2026

(54) CONTROL APPARATUS, OPTICAL APPARATUS, CONTROL METHOD, AND STORAGE MEDIUM

(71) Applicant: CANON KABUSHIKI KAISHA, Tokyo (JP)

(72) Inventor: Takamitsu Miyazaki, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 304 days.

(21) Appl. No.: 18/631,495

(22) Filed: Apr. 10, 2024

(65) Prior Publication Data

US 2024/0364238 A1 Oct. 31, 2024

(30) Foreign Application Priority Data

Apr. 26, 2023 (JP) ................................ 2023-072088

(51) Int. Cl.

| | |
|---|---|
| ***H02N 2/06*** | (2006.01) |
| ***H02N 2/02*** | (2006.01) |
| ***H02N 2/14*** | (2006.01) |
| ***H04N 23/67*** | (2023.01) |
| ***H04N 23/68*** | (2023.01) |

(52) U.S. Cl.

CPC ............ *H02N 2/062* (2013.01); *H02N 2/026* (2013.01); *H02N 2/142* (2013.01); *H04N 23/67* (2023.01); *H04N 23/683* (2023.01)

(58) Field of Classification Search

CPC ........ H02N 2/062; H02N 2/026; H02N 23/67; H04N 23/683; G03B 3/00; G03B 2205/0061

See application file for complete search history.

(56) References Cited

U.S. PATENT DOCUMENTS

| | | | | |
|---|---|---|---|---|
| 5,736,822 A * | 4/1998 | Mitarai | H02N 2/008 318/116 |
| 10,742,139 B2 * | 8/2020 | Atsuta | H02N 2/163 |
| 2023/0033426 A1 * | 2/2023 | Sumioka | H04N 23/67 |

FOREIGN PATENT DOCUMENTS

| | | | |
|---|---|---|---|
| CN | 107357166 B * | 11/2020 | G05B 13/042 |
| JP | H11-515070 * | 12/1999 | B60G 17/018 |
| WO | 2020121772 A1 | 6/2020 | |

* cited by examiner

*Primary Examiner* — Christopher E Mahoney
(74) *Attorney, Agent, or Firm* — ROSSI, KIMMS & McDOWELL LLP

(57) ABSTRACT

A control apparatus controls an actuator with a plurality of control signals, and includes a memory storing instructions, and a processor configured to execute the instructions to perform linear control to output a first operation amount based on a state amount of the actuator detected by a detector, perform nonlinear control to output a second operation amount based on the detected state amount, and output the plurality of control signals based on the first operation amount and the second operation amount.

20 Claims, 11 Drawing Sheets

CONTROL APPARATUS, OPTICAL APPARATUS, CONTROL METHOD, AND STORAGE MEDIUM

BACKGROUND

Technical Field

One of the aspects of the embodiments relates to a control apparatus, an optical apparatus, a control method, and a storage medium.

Description of Related Art

A vibration actuator is an actuator that is controllable based on a plurality of control inputs and used to, for example, drive a lens in an optical apparatus. The vibration actuator is controlled by determining an operation amount by using a feedback controller and distributing the operation amount to the plurality of control inputs. However, the vibration actuator has nonlinearity in the operation amount-speed characteristic, and thus driving performance may degrade in linear control.

PCT International Publication WO 2020/121772 discloses a control method of performing, for the nonlinearity in the operation amount-speed characteristic, linearization correction by adjusting the operation amount based on the previously set table data or theoretical formula.

However, the control method disclosed in PCT International Publication WO 2020/121772 may not be able to perform proper correction for nonlinear characteristic changes due to changes over time of the vibration actuator or the like.

SUMMARY

A control apparatus according to one aspect of the disclosure controls an actuator with a plurality of control signals, and includes a memory storing instructions, and a processor configured to execute the instructions to perform linear control to output a first operation amount based on a state amount of the actuator detected by a detector, perform nonlinear control to output a second operation amount based on the detected state amount, and output the plurality of control signals based on the first operation amount and the second operation amount. Each of an optical apparatus having the above control apparatus, a control method corresponding to the above control apparatus, and a storage medium storing a program that causes a computer to execute the above control method also constitutes another aspect of the disclosure.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

A detailed description will be given of embodiments of the disclosure with reference to the accompanying drawings.

First Embodiment

Figure 1:
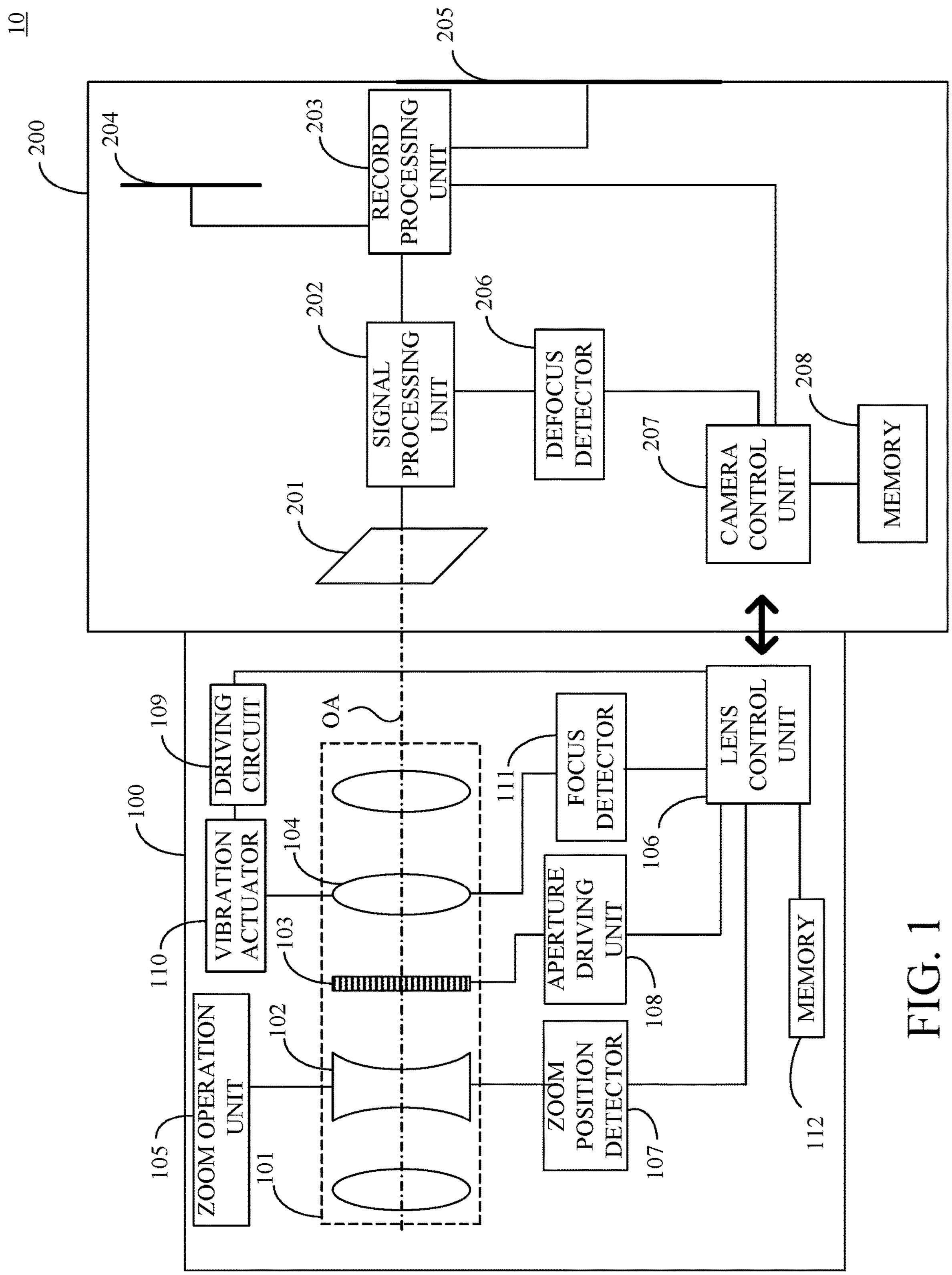
FIG. 1 is a configuration diagram of an image pickup system in each embodiment.

A description will now be given of an image pickup system (lens interchangeable camera system) 10 according to a first embodiment of this disclosure. FIG. 1 is a configuration diagram of the image pickup system 10. The image pickup system 10 includes a lens apparatus (optical apparatus) 100 and a camera body 200. The lens apparatus 100 and the camera body 200 are mechanically and electrically connected to each other through an unillustrated mount, and power supply and mutual communication between the lens apparatus 100 and the camera body 200 are performed through terminals provided at the mount. In this embodiment, the lens apparatus 100 and the camera body 200 are attachable to and detachable from each other, but each embodiment is not limited to this example and the lens apparatus 100 and the camera body 200 may be integrated with each other.

The lens apparatus 100 includes an optical system 101 through which an optical image of an object is imaged on an image sensor 201 in the camera body 200. The optical system 101 includes a magnification-varying lens 102, an aperture stop 103, and a focus lens 104, but each embodiment is not limited to this configuration. The lens apparatus 100 is a zoom lens having a variable focal length.

In a case where a zoom operation unit 105 is operated, the magnification-varying lens 102 moves in a direction (optical axis direction) along an optical axis OA to change the focal length of the lens apparatus 100. A zoom position detector 107 is a position sensor configured to detect the position of the magnification-varying lens 102 and is a highly durable sensor with a simple configuration, such as a potentiometer. The zoom position detector 107 detects the position of the magnification-varying lens 102 and outputs a detection signal to a lens control unit 106. The aperture stop 103 includes unillustrated aperture blades and adjusts light quantity with the blades being moved by an aperture driving unit 108 through an actuator.

The focus lens 104 adjusts a focus state by moving in the optical axis direction through a driving circuit 109 and a vibration actuator (actuator) 110. The driving circuit 109 amplifies a driving signal received from the lens control unit 106 and applies the amplified driving signal to the vibration actuator 110. A focus detector 111 includes a position sensor configured to detect the position of the focus lens 104 and outputs a signal in accordance with a state amount of the actuator such as position or speed to the lens control unit 106. The position sensor of the focus detector 111 is, for example, an optical encoder including an optical scale and an optical sensor, the optical scale having a grayscale pattern, the optical sensor including a light receiving unit configured to receive light emitted from a light emitting unit and reflected by the optical scale. Speed information can be generated based on position information about the actuator, which has been obtained by the position sensor.

The lens control unit 106 is a computer (control unit) including a central processing unit (CPU). The lens control unit 106 transmits a driving signal to each of the aperture driving unit 108 and the driving circuit 109 and controls driving of the aperture stop 103 and the focus lens 104. A memory 112 is a storage unit such as a read-only memory (ROM) or a random access memory (RAM). The memory 112 stores, for example, designing information and adjustment value information that are necessary to calculate the absolute position of the magnification-varying lens 102. The memory 112 also stores optical information and individual adjustment value that are necessary to drive each of the aperture stop 103 and the focus lens 104, and an ideal speed characteristic of the actuator. The zoom operation unit 105 includes a mechanism such as a zoom ring for manually driving the zoom lens (magnification-varying lens 102), or a mechanism for electrically driving the zoom lens by the actuator.

The camera body 200 includes the image sensor 201, a signal processing unit 202, a record processing unit 203, a defocus detector 206, a camera control unit 207, a memory 208, an electronic finder 204, and a display unit 205. The image sensor 201 includes a CMOS sensor or the like, generates an electric signal (analog signal) by photoelectrically converting an optical image (an object image) formed by the optical system 101, and outputs the electric signal to the signal processing unit 202. The image sensor 201 includes unillustrated in-focus position detecting pixels in addition to imaging pixels. The signal processing unit 202 converts the electric signal from the image sensor 201 into a digital signal (image data). In addition, the signal processing unit 202 performs various kinds of image processing such as noise removal and color correction on the digital signal and outputs image data provided with the image processing to the record processing unit 203. The record processing unit 203 displays the input image data on the electronic finder 204 or the display unit 205.

The defocus detector 206 detects, through a micro lens that performs pupil division, a phase difference between signals of a pair of object images obtained with light incident on the focus detecting pixels on the image sensor 201. In addition, the defocus detector 206 determines a defocus amount based on the detected phase difference and outputs a defocus amount to the camera control unit 207. The camera control unit 207 is a calculator including a CPU and electrically connected to each of the record processing unit 203, the defocus detector 206, and the memory 208. The camera control unit 207 reads and executes a computer program recorded in the memory 208 and communicates with the lens control unit 106 to obtain information necessary for autofocus (AF) control. In addition, the camera control unit 207 controls the camera body 200 in accordance with an input from an unillustrated camera operation unit including an imaging switch and various setting switches.

Figure 2:
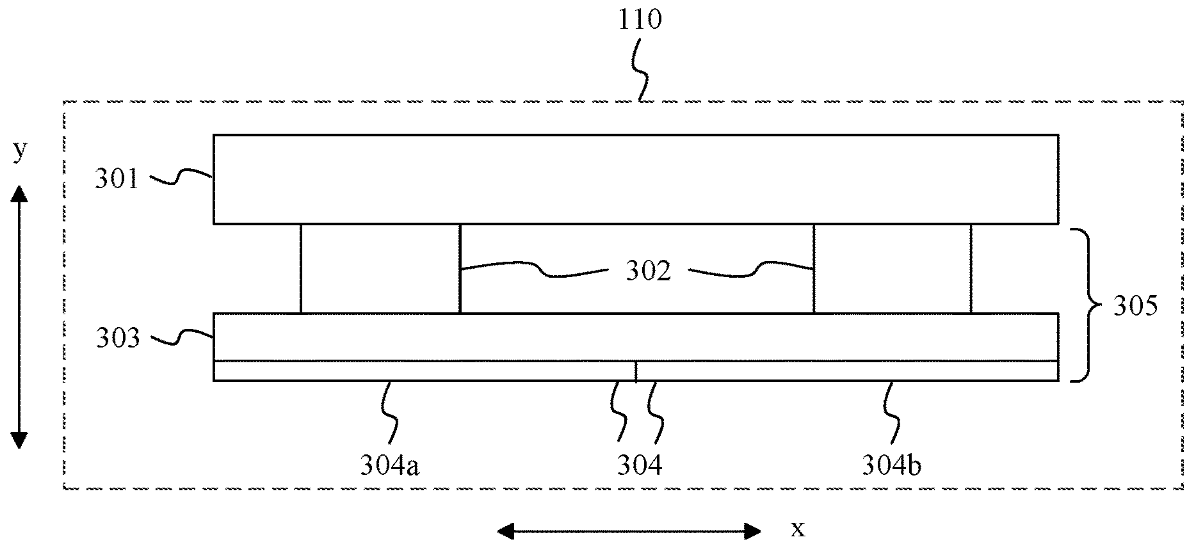
FIG. 2 is a configuration diagram of a vibration actuator in each embodiment.

Referring now to FIG. 2, a description will be given of the configuration of the vibration actuator 110 as the actuator in this embodiment. FIG. 2 is a configuration diagram of the vibration actuator 110. The vibration actuator 110 includes a vibration body 305 and a contact body 301. The vibration body 305 has a configuration in which a metal elastic body 303 having protrusion portions 302 is joined to piezoelectric elements 304 as electricity-machine energy conversion elements. The piezoelectric elements 304 include two piezoelectric elements 304*a* and 304*b*.

The contact body 301 contacts the protrusion portions 302 of the vibration body 305 under pressurization in a y direction. When driving signals that are frequency signals (a first frequency signal and a second frequency signal) with a plurality of phases (two phases in this embodiment) having a phase difference are applied to the piezoelectric elements 304*a* and 304*b*, vibration is excited at the piezoelectric elements 304 and the distal end of each protrusion portion 302 elliptically rotates. Since there is friction between each protrusion portion 302 and the contact body 301, the vibration body 305 and the contact body 301 move relative to each other. More specifically, among the vibration body 305 and the contact body 301, a movable object that is not fixed moves relative to a fixed body. In this embodiment, the vibration body 305 as the movable object moves in an x direction relative to the contact body 301 as the fixed body.

A driving signal in this embodiment is a rectangular wave pulse signal. The speed of the movable object can be controlled by changing the phase difference between and the frequencies of two-phase driving signals. The speed of the movable object can be controlled also by changing a duty ratio that is a ratio of the pulse width of a driving signal per period and changing the voltage amplitude of the driving signal.

Figure 3:
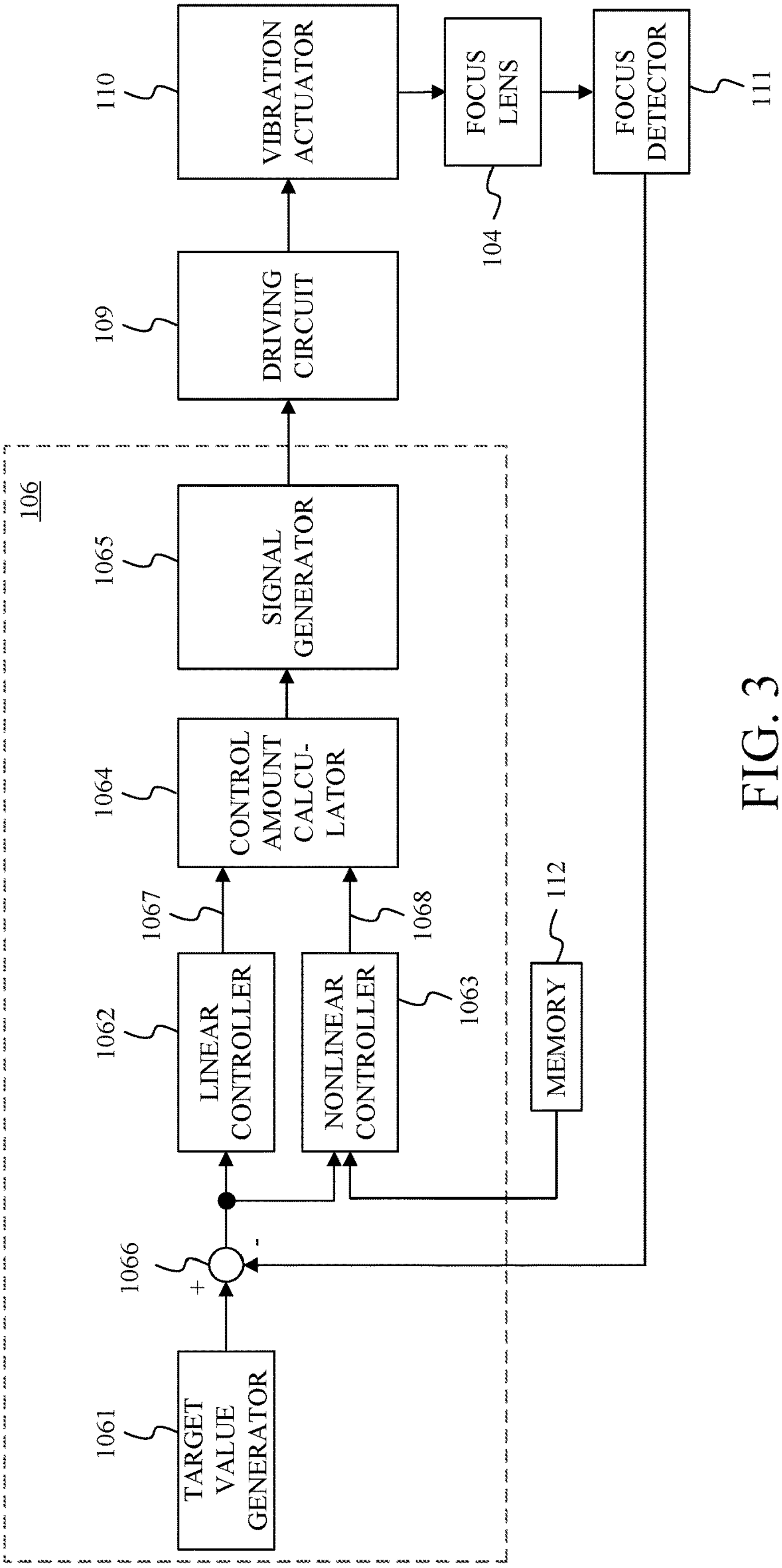
FIG. 3 is a block diagram of an actuator control apparatus in the first to fourth embodiments.

Referring now to FIG. 3, a description will be given of an actuator control apparatus including the lens control unit 106 in this embodiment. FIG. 3 is a block diagram of the actuator control apparatus. The lens control unit 106 includes a target value generator 1061, a linear controller 1062, a nonlinear controller 1063, a control amount calculator 1064, a signal generator 1065, and a subtractor 1066.

The target value generator 1061 generates a target value such as a target position or a target speed of the vibration actuator 110 based on AF information received from the camera control unit 207. The subtractor 1066 calculates a position deviation that is a difference between the target position generated by the target value generator 1061 and the actual position of the focus lens 104, which has been detected by the focus detector 111.

The linear controller (linear control unit) 1062 is a controller configured to output an operation amount (first operation amount) 1067 for decreasing the position deviation calculated by the subtractor 1066, and linearly control the vibration actuator 110 based on the target value. The nonlinear controller (nonlinear control unit) 1063 is a controller configured to output an operation amount (second operation amount) 1068 for performing linearization correction for the speed characteristic of the vibration actuator 110, and control a control amount different from a control amount controlled by the linear controller 1062. In other words, the operation amounts 1067 and 1068 are operation amounts of kinds different from each other.

The control amount calculator (calculating unit) 1064 outputs a plurality of control amounts (control inputs or control signals) by converting the operation amount 1067 calculated by the linear controller 1062 and the operation amount 1068 calculated by the nonlinear controller 1063 into control amounts different from each other. The signal generator 1065 generates a driving signal for controlling the speed of the vibration actuator 110 based on the plurality of control amounts calculated by the control amount calculator 1064 and outputs the generated driving signal to the driving circuit 109. The lens control unit 106 can control the vibration actuator 110 by periodically performing such processing from target value generation to driving signal generation.

Figure 4:
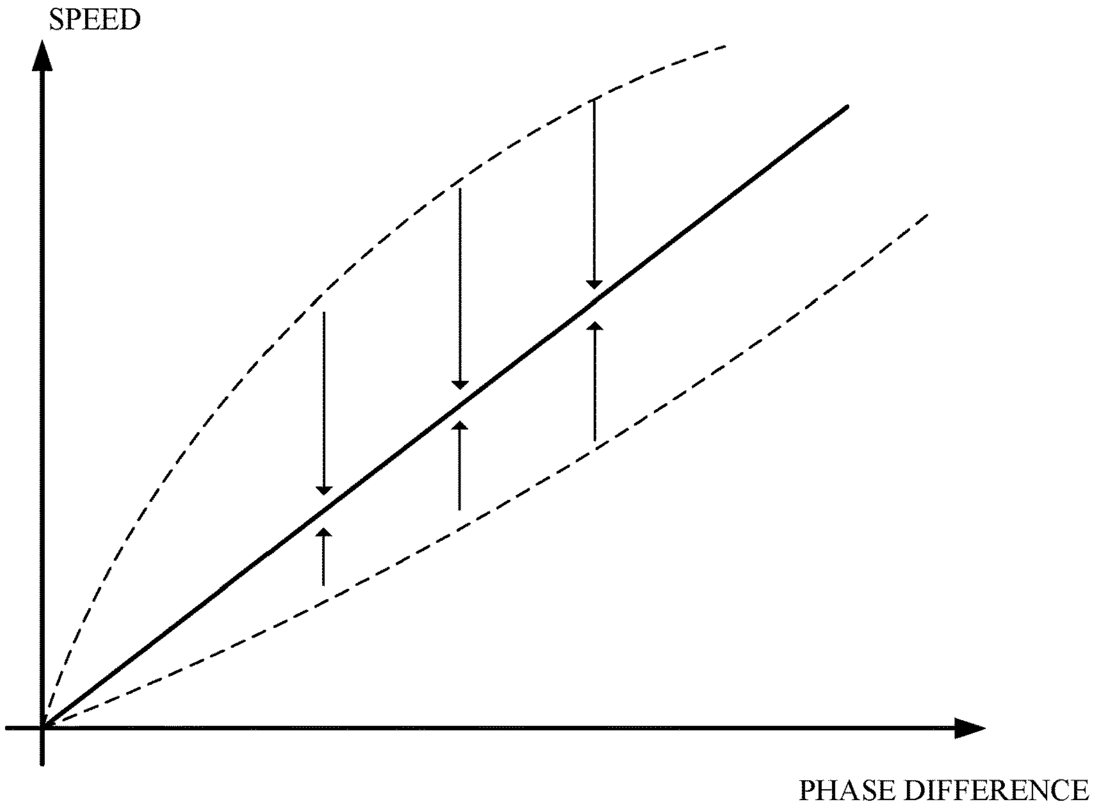
FIG. 4 illustrates the phase difference-speed characteristic of the vibration actuator in each embodiment.
Figure 5:
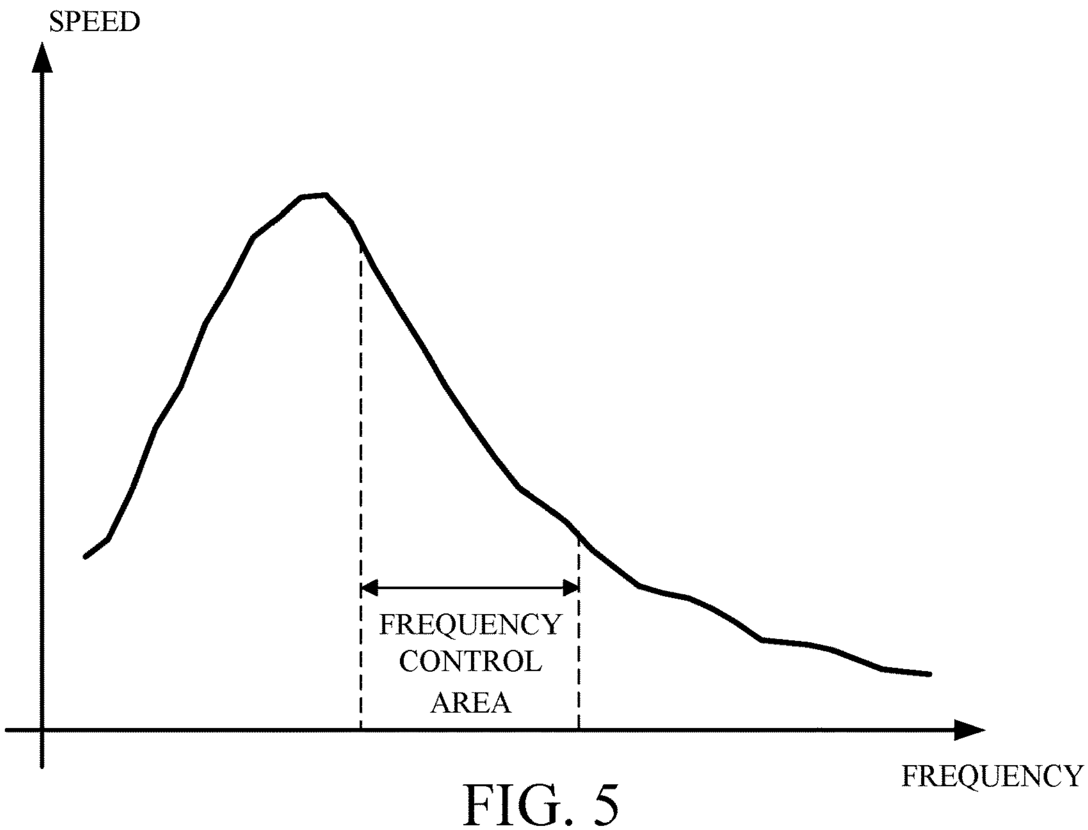
FIG. 5 illustrates the frequency-speed characteristic of the vibration actuator in each embodiment.

Referring now to FIGS. 4 and 5, a description will be given of a method of controlling the vibration actuator 110. FIG. 4 illustrates a phase difference-speed characteristic of the vibration actuator 110. In FIG. 4, the horizontal axis represents the phase difference and the vertical axis represents the speed. The vibration actuator 110 ideally has a linear speed characteristic like a solid line illustrated in FIG. 4, and thus linear control using the phase difference is available. FIG. 5 illustrates a frequency-speed characteristic of the vibration actuator 110. In FIG. 5, the horizontal axis represents the frequency and the vertical axis represents the speed. In a frequency control range illustrated in FIG. 5, the frequency-speed characteristic is linear, and thus linear control with the frequency is available.

In this embodiment, a proportional-integral differential (PID) controller is used as the linear controller 1062 to perform the linear control using the phase difference. The linear controller 1062 tracks the focus lens 104 to the target position by calculating the operation amount 1067 so as to reduce the position deviation calculated by the subtractor 1066 and by controlling the phase difference based on the operation amount 1067. Stable control is possible in a case where the relationship between the phase difference and the speed is linear like the characteristic illustrated with the solid line in FIG. 4.

However, like a characteristic illustrated with the dashed lines in FIG. 4, the speed characteristic is nonlinear in some cases due to individual differences, changes over time, environment changes, orientation changes, or the like of the vibration actuator 110. In such a case, the control performance of the linear controller 1062 may degrade. The nonlinear controller 1063 performs linearization correction for such nonlinear change of the speed characteristic. Next follows the procedure of calculating the operation amount 1068 by the nonlinear controller 1063 in this embodiment.

The memory 112 previously stores the ideal phase difference-speed characteristic illustrated with the solid line in FIG. 4. From this characteristic, a target speed for the phase difference can be calculated. A difference between the calculated target speed and the actual speed is speed deviation and corresponds to a difference between the solid line and each dashed line in FIG. 4 (difference from the ideal characteristic). As illustrated in FIG. 5, the frequency and the speed are correlated. Thus, the operation amount 1068 is calculated by multiplying the speed deviation by a gain to increase the frequency in a case where the speed is excessive or to decrease the frequency in a case where the speed is insufficient. In this manner, this embodiment performs the frequency control based on the operation amount 1068 to correct the phase difference-speed characteristic from the characteristics illustrated by the dashed lines in FIG. 4 to the characteristic illustrated by the solid line (to the ideal linear characteristic).

In this embodiment, the nonlinear controller 1063 calculates the operation amount 1068 by multiplying the speed deviation by the gain but may be a controller such as a PID controller in addition to gain multiplication. The linear controller 1062 and the nonlinear controller 1063 may be obtained based on the sliding mode control theory.

Figure 6:
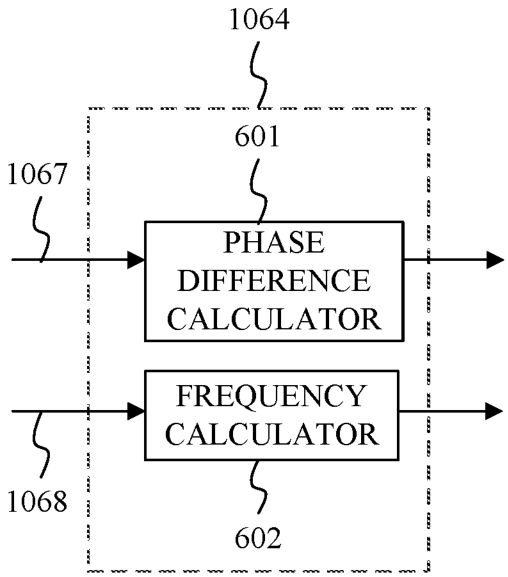
FIG. 6 is a block diagram of a control amount calculator in the first embodiment.

Referring now to FIG. 6, a description will be given of the configuration of the control amount calculator 1064 in this embodiment. FIG. 6 is a block diagram of the control amount calculator 1064. The control amount calculator 1064 includes a phase difference calculator 601 and a frequency calculator 602. The phase difference calculator 601 calculates the phase difference (first control signal) between driving signals based on the operation amount 1067 calculated by the linear controller 1062. The frequency calculator 602 calculates the frequency (second control signal) of each driving signal based on the operation amount 1068 calculated by the nonlinear controller 1063.

In this and following embodiments, the first control signal may be a signal relating to at least one of a phase difference, a frequency, and a duty ratio, and the second control signal may be a signal relating to at least another one of the phase difference, the frequency, and the duty ratio. In other words, the first control signal and the second control signal are mutually different kinds of signals and are each at least one signal selected from among a phase difference, a frequency, and a duty ratio.

The signal generator 1065 generates a driving signal based on the phase difference and the frequency calculated by the control amount calculator 1064. In this manner, the nonlinear controller 1063 controls the frequency for each calculation period and dynamically performs the linearization correction for the phase difference-speed characteristic. The linear controller 1062 linearly controls the phase difference using the speed characteristic for which the linearization correction has been performed. This embodiment does not control each duty ratio but fixes the duty ratio to a previously set value.

Figure 7:
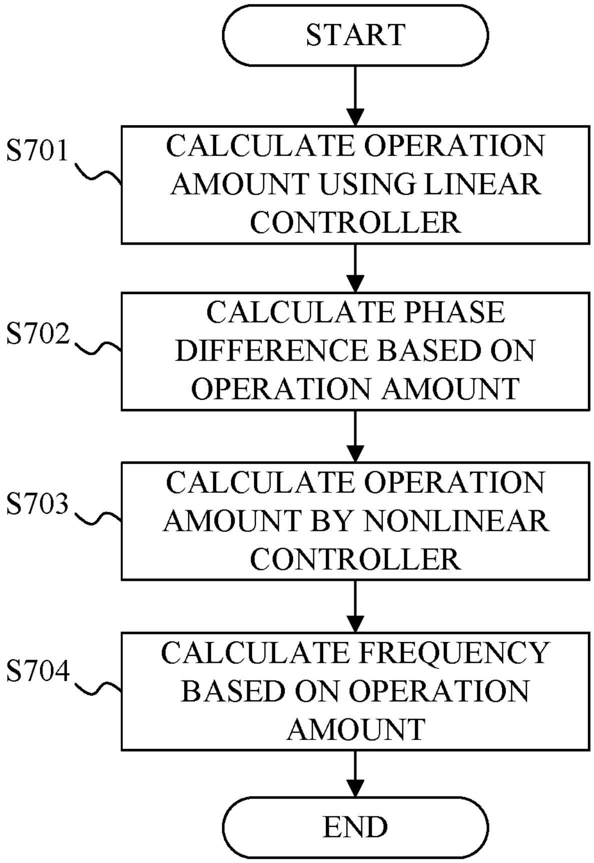
FIG. 7 is a flowchart illustrating control amount calculating processing in the first embodiment.

Referring now to FIG. 7, a description will be given of control amount calculating processing (control method) according to this embodiment. FIG. 7 is a flowchart illustrating the control amount calculating processing.

First, at step S701, the linear controller 1062 calculates the operation amount 1067 based on the position deviation calculated by the subtractor 1066. Next, at step S702, the phase difference calculator 601 calculates the phase difference based on the operation amount 1067 calculated at step S701 and outputs the calculated phase difference as a control amount.

Next, at step S703, the nonlinear controller 1063 calculates the operation amount 1068 for correcting nonlinear change of the phase difference-speed characteristic of the vibration actuator 110 based on the speed deviation. In a case where the speed deviation is zero, the speed characteristic is on the ideal linear characteristic and accordingly, the operation amount 1068 is zero and thus correction is not performed. Next, at step S704, the frequency calculator 602 calculates a frequency correcting amount based on the operation amount 1068 calculated at step S703. At initial control calculation of each driving, the frequency calculator 602 outputs, as a control amount, a frequency obtained by adding the calculated frequency correcting amount to a previously set reference frequency. At the second control calculation or later, the frequency calculator 602 outputs, as a control amount, a frequency obtained by adding the calculated frequency correcting amount to the last frequency.

Thus, one cycle of the control amount calculating processing in this embodiment ends. In a case where this calculation processing is performed for each calculating period, nonlinear speed characteristic change that cannot be uniformly corrected due to individual differences, changes over time, environment changes, or orientation changes of an actuator that is controllable with a plurality of control inputs is dynamically corrected and driving performance degradation can be prevented.

In this embodiment, a threshold may be provided to the operation amount 1068 per cycle calculated by the nonlinear controller 1063 (the operation amount 1068 for each calculation period may be limited to a predetermined amount (threshold)). A small value is set as the threshold, and in a case where the operation amount 1068 is smaller than the threshold, the operation amount 1068 is rounded to zero and no correction is performed. Thereby, the control oscillation risk can be prevented.

The lens control unit 106 controls the vibration actuator 110 as a control target in this embodiment, but this embodiment is not limited to this example. The control target may be an actuator drivable according to an input, such as a brushless DC motor. In this case, control is possible by converting the operation amounts 1067 and 1068 calculated by the linear controller 1062 and the nonlinear controller 1063, respectively, into any of the voltage amplitude or advance angle (lead angle) of each driving signal. Moreover, the vibration actuator 110 drives the focus lens 104 as an optical member in this embodiment, but this embodiment is not limited to this example. This embodiment is also applicable to an actuator that drives another optical member. These points are similarly applied to the following embodiments.

Second Embodiment

A description will now be given of a second embodiment of this disclosure. In this embodiment, the lens control unit 106 controls the vibration actuator 110 by controlling the phase difference using the linear controller 1062 and by controlling the frequency and the duty ratio using the nonlinear controller 1063. The nonlinear controller 1063 performs linearization correction mainly using the frequency control. The nonlinear controller 1063 provides a threshold (operation amount threshold) for limiting the frequency correcting amount. In a case where the operation amount 1068 is larger than the threshold, the nonlinear controller 1063 converts the excess portion of the operation amount 1068 over the threshold into a duty ratio and performs control.

Figure 8:
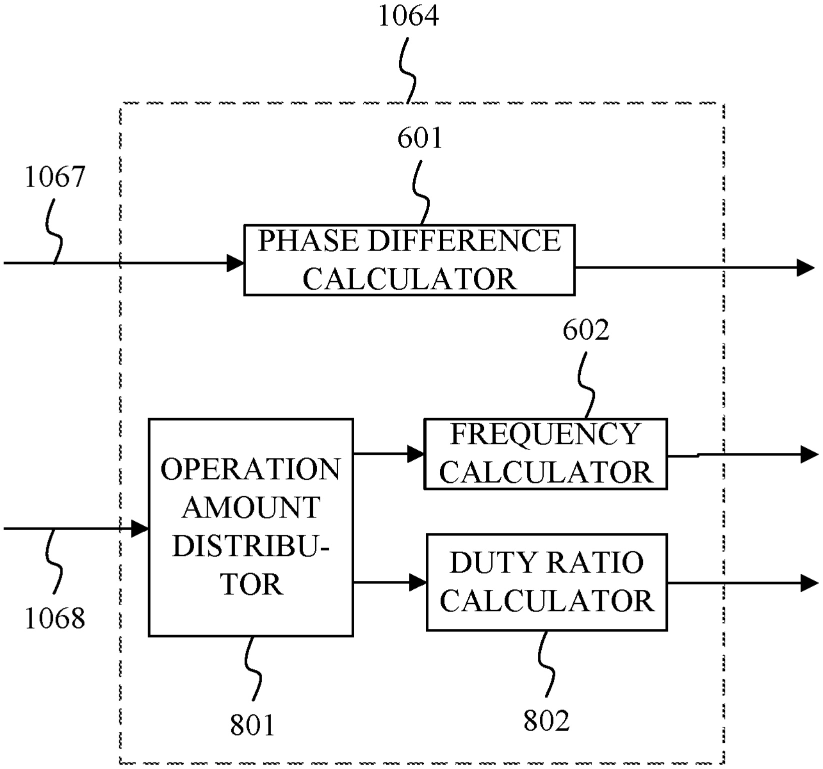
FIG. 8 is a block diagram of the control amount calculator in the second and third embodiments.

Referring now to FIG. 8, a description will be given of the control amount calculator 1064 in this embodiment. FIG. 8 is a block diagram of the control amount calculator 1064 according to this embodiment. The control amount calculator 1064 includes the phase difference calculator 601, an operation amount distributor 801, the frequency calculator 602, and a duty ratio calculator 802.

As in the first embodiment, the phase difference calculator 601 calculates a phase difference (first control signal) between driving signals based on the operation amount (first operation amount) 1067 calculated by the linear controller 1062. The operation amount distributor 801 distributes the operation amount 1068 calculated by the nonlinear controller 1063 to the frequency calculator 602 and the duty ratio calculator 802 based on a previously set threshold (operation amount threshold). The threshold is used to limit the frequency correcting amount. In a case where the operation amount 1068 is equal to or smaller than the threshold, the operation amount distributor 801 outputs the operation amount 1068 as it is to the frequency calculator 602 whereas output to the duty ratio calculator 802 is zero. In a case where the operation amount 1068 is larger than the threshold, the operation amount distributor 801 outputs the operation amount 1068 up to the threshold to the frequency calculator 602 and outputs the excess portion of the operation amount 1068 over the threshold to the duty ratio calculator 802.

The frequency calculator 602 calculates the frequency of each driving signal based on the operation amount 1068 equal to or smaller than the threshold, which has been calculated by the operation amount distributor 801. The duty ratio calculator 802 calculates the duty ratio of each driving signal based on the excess portion of the operation amount 1068 over the threshold, which has been calculated by the operation amount distributor 801.

The signal generator 1065 generates a driving signal based on the phase difference, the frequency, and the duty ratio calculated by the control amount calculator 1064. In this manner, the nonlinear controller 1063 controls the frequency and the duty ratio for each calculation period, thereby dynamically performing linearization correction for the phase difference-speed characteristic. The linear controller 1062 linearly controls the phase difference using the speed characteristic for which the linearization control has been performed.

Figure 9:
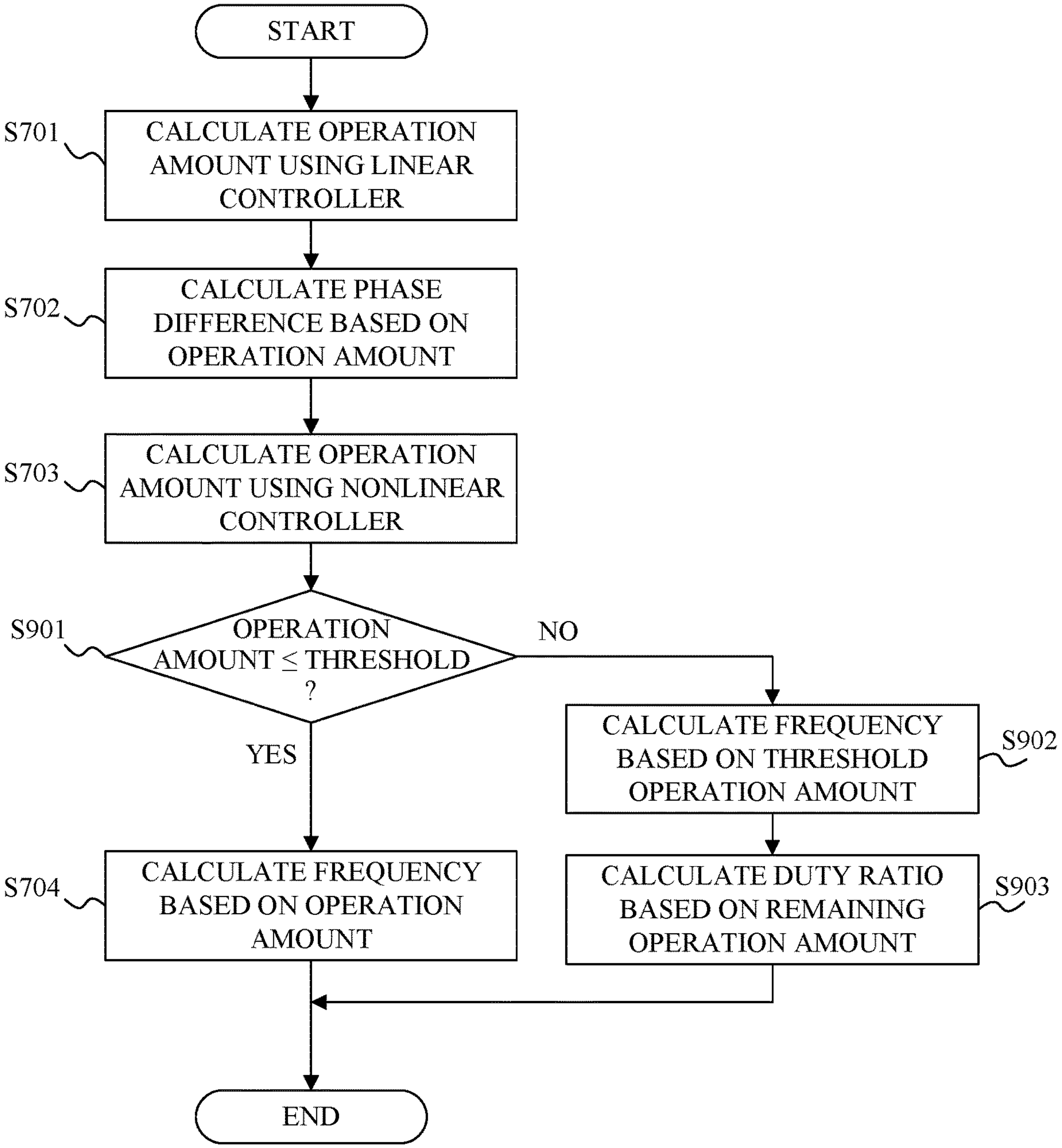
FIG. 9 is a flowchart illustrating control amount calculating processing in the second embodiment.

Referring now to FIG. 9, a description will be given of control amount calculating processing (control method) according to this embodiment. FIG. 9 is a flowchart illustrating the control amount calculating processing according to this embodiment. As in the calculation processing described in the first embodiment with reference to FIG. 7, at steps S701 and S702, the linear controller 1062 calculates the operation amount 1067 and the phase difference calculator 601 calculates the phase difference based on the operation amount 1067. At step S703, the nonlinear controller 1063 calculates the operation amount 1068 for linearizing the speed characteristic.

Next, at step S901, the operation amount distributor 801 determines whether the operation amount 1068 calculated at step S703 is equal to or smaller than the previously set threshold. In a case where it is determined that the operation amount 1068 is equal to or smaller than the threshold, the flow proceeds to step S704. In a case where it is determined that the operation amount 1068 is larger than the threshold, the flow proceeds to step S902.

At step S704, the operation amount distributor 801 outputs the operation amount 1068 equal to or smaller than the threshold, which has been calculated at step S703, to the frequency calculator 602. The frequency calculator 602 calculates the frequency based on the operation amount 1068 equal to or smaller than the threshold, which has been output by the operation amount distributor 801. Then, the control amount calculating processing ends.

At step S902, the operation amount distributor 801 outputs the operation amount 1068 calculated at step S703 up to the threshold (threshold operation amount) to the frequency calculator 602. The frequency calculator 602 calculates frequency based on the threshold of the operation amount 1068 output from the operation amount distributor 801.

Next, at step S903, the operation amount distributor 801 outputs the excess portion of the operation amount 1068 calculated at step S703 over the threshold (a value obtained by subtracting the threshold from the operation amount 1068, in other words, the remaining operation amount) to the duty ratio calculator 802. The duty ratio calculator 802 calculates a duty ratio correcting amount based on the excess portion of the operation amount 1068 over the threshold, which has been output from the operation amount distributor 801.

As described above, in a case where the operation amount 1068 is smaller than the threshold, the control amount calculator 1064 calculates a signal relating to the frequency based on the operation amount 1068. In a case where the operation amount 1068 is larger than the threshold, the control amount calculator 1064 calculates a signal relating to the frequency based on the threshold and calculates a signal relating to the duty ratio based on the operation amount obtained by subtracting the threshold from the operation amount 1068.

In the initial calculation period of each driving, a value obtained by adding a correction amount to the previously set reference duty ratio is set as the duty ratio of a driving signal. In the second or subsequent calculation period, a value obtained by adding the correction amount to the duty ratio calculated in the previous calculation period is set as the duty ratio of a driving signal. Then, the control amount calculating processing ends.

This processing is one cycle of the control amount calculating processing in this embodiment. As understood from the frequency-speed characteristic of the vibration actuator 110 illustrated in FIG. 5, the speed increases as the frequency decreases, but there is an area where the speed decreases as the frequency decreases too much. In that area, correction of the speed characteristic by frequency control provides the opposite result, and correction cannot be properly performed. Accordingly, a threshold (operation amount threshold) for limiting the frequency correcting amount is provided to avoid that area by performing duty ratio correction to the excess portion over the threshold. Thereby, processing equivalent to that in the first embodiment can be provided. Moreover, a threshold for avoiding noise that might occur in the vibration actuator 110 in a particular frequency area may be set to the processing.

Third Embodiment

A description will now be given of a third embodiment of this disclosure. In this embodiment, as in the second embodiment, the lens control unit 106 controls the vibration actuator 110 by controlling the phase difference using the linear controller 1062 and controlling the frequency and the duty ratio using the nonlinear controller 1063. In this embodiment, the nonlinear controller 1063 performs linearization correction mainly by duty ratio control and provides a threshold (threshold of the operation amount 1068) for limiting the duty ratio correcting amount. In a case where a duty ratio is larger than the threshold, the nonlinear controller 1063 converts the excess portion of the operation amount 1068 over the threshold into a frequency and performs control.

The control amount calculator 1064 in this embodiment has the same configuration as that of the second embodiment. As illustrated in FIG. 8, the control amount calculator 1064 includes the phase difference calculator 601, the operation amount distributor 801, the frequency calculator 602, and the duty ratio calculator 802.

As in the first embodiment, the phase difference calculator 601 calculates the phase difference between driving signals based on the operation amount 1067 calculated by the linear controller 1062. The operation amount distributor 801 distributes the operation amount 1068 calculated by the nonlinear controller 1063 to the frequency calculator 602 and the duty ratio calculator 802 based on the previously set threshold (operation amount threshold). The threshold is used to limit the duty ratio correcting amount. In a case where the operation amount 1068 is equal to or smaller than the threshold, the operation amount distributor 801 outputs the operation amount 1068 as it is to the duty ratio calculator 802 whereas output to the frequency calculator 602 is zero. In a case where the operation amount 1068 is larger than the threshold, the operation amount distributor 801 outputs the operation amount 1068 up to the threshold to the duty ratio calculator 802, and outputs the excess portion of the operation amount 1068 over the threshold to the frequency calculator 602.

The control amount calculating method by the duty ratio calculator 802 and the frequency calculator 602 is the same as the calculation method in the second embodiment, and the duty ratio and frequency are calculated based on the operation amount 1068 output from the operation amount distributor 801. The signal generator 1065 generates a driving signal based on the phase difference, the frequency, and the duty ratio calculated by the control amount calculator 1064. Thus, the nonlinear controller 1063 controls the duty ratio and the frequency for each calculation period, thereby dynamically performing linearization correction for the phase difference-speed characteristic. The linear controller 1062 linearly controls the phase difference using the speed characteristic for which the linearization correction has been performed.

Figure 10:
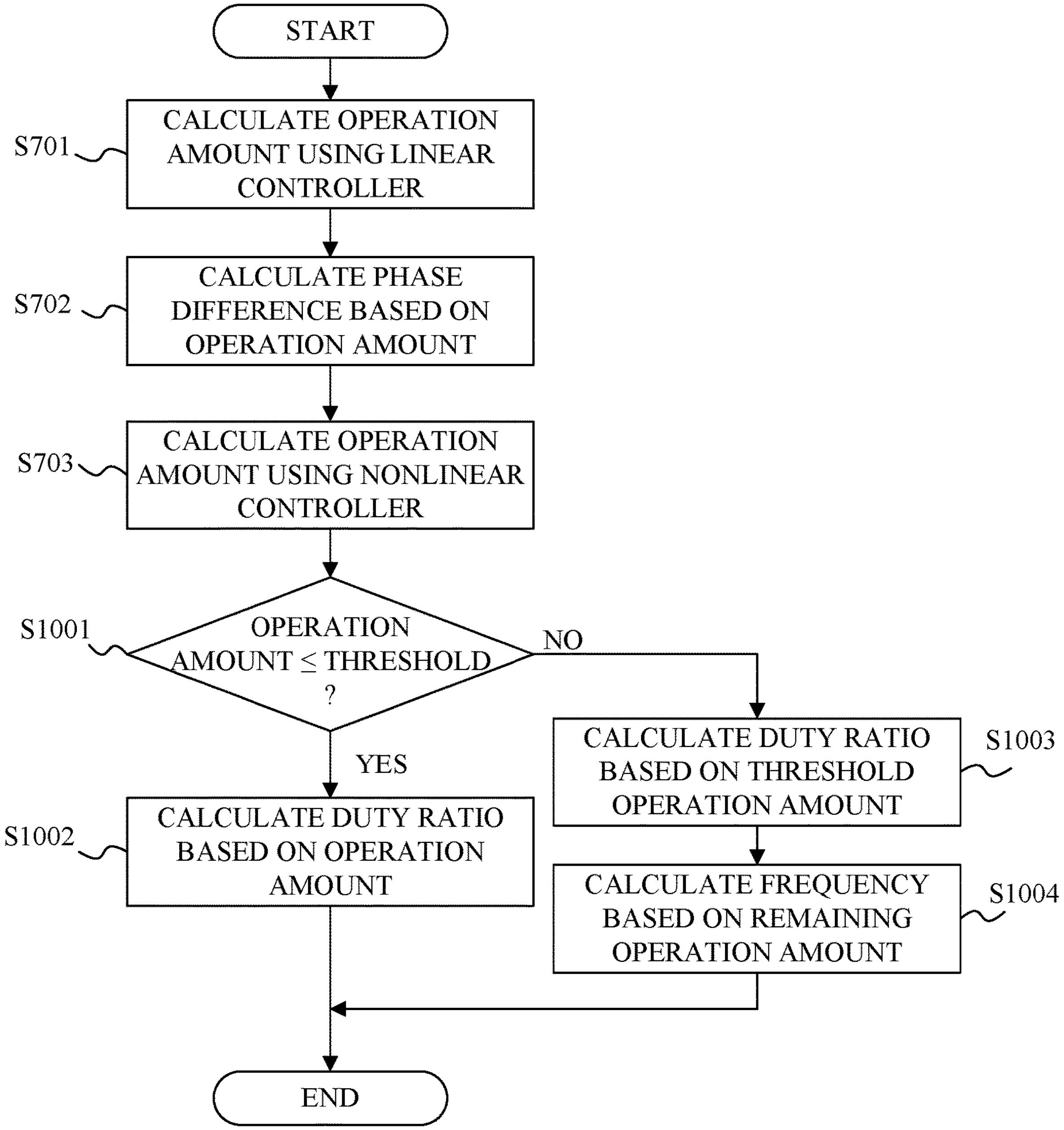
FIG. 10 is a flowchart illustrating control amount calculating processing in the third embodiment.

Referring now to FIG. 10, a description will be given of control amount calculating processing (control method) according to this embodiment. FIG. 10 is a flowchart illustrating the control amount calculating processing according to this embodiment. As in the calculation processing described in the first embodiment with reference to FIG. 7, at steps S701 and S702, the linear controller 1062 calculates the operation amount 1067 and the phase difference calculator 601 calculates the phase difference based on the operation amount 1067. At step S703, the nonlinear controller 1063 calculates the operation amount 1068 for linearizing the speed characteristic.

Next at step S1001, the operation amount distributor 801 determines whether the operation amount 1068 calculated at step S703 is equal to or smaller than the previously set threshold. In a case where it is determined that the operation amount 1068 is equal to or smaller than the threshold, the flow proceeds to step S1002. In a case where it is determined that the operation amount 1068 is larger than the threshold, the flow proceeds to step S1003.

At step S1002, the operation amount distributor 801 outputs the operation amount 1068 equal to or smaller than the threshold, which has been calculated at step S703 to the duty ratio calculator 802. The duty ratio calculator 802 calculates the duty ratio based on the operation amount 1068 equal to or smaller than the threshold, which has been output by the operation amount distributor 801. Then, the control amount calculating processing ends.

At step S1003, the operation amount distributor 801 outputs the operation amount 1068 calculated at step S703 up to the threshold (threshold operation amount) to the duty ratio calculator 802. The duty ratio calculator 802 calculates the duty ratio based on the threshold of the operation amount 1068 output from the operation amount distributor 801.

Next, at step S1004, the operation amount distributor 801 outputs the excess portion of the operation amount 1068 calculated at step S703 over the threshold (value obtained by subtracting the threshold from the operation amount 1068, in other words, the remaining operation amount) to the frequency calculator 602. The frequency calculator 602 calculates the frequency based on the excess portion of the operation amount 1068 over the threshold, which has been output from the operation amount distributor 801. Then, the control amount calculating processing ends. This is one cycle of the control amount calculating processing according to this embodiment.

Thus, in a case where the operation amount 1068 is larger than the threshold, this embodiment calculates a signal relating to the duty ratio based on the threshold, and calculates a signal relating to the frequency based on an operation amount obtained by subtracting the threshold from the operation amount 1068. Since the threshold for limiting the duty ratio correcting amount is provided and the frequency correction is performed using the excess portion over the threshold, processing equivalent to that in the first embodiment can be performed while electric power is maintained under a reference value.

Fourth Embodiment

A description will now be given of a fourth embodiment of this disclosure. In this embodiment, the lens control unit 106 controls the vibration actuator 110 by controlling the frequency using the linear controller 1062 and by controlling the phase difference using the nonlinear controller 1063.

Figure 11:
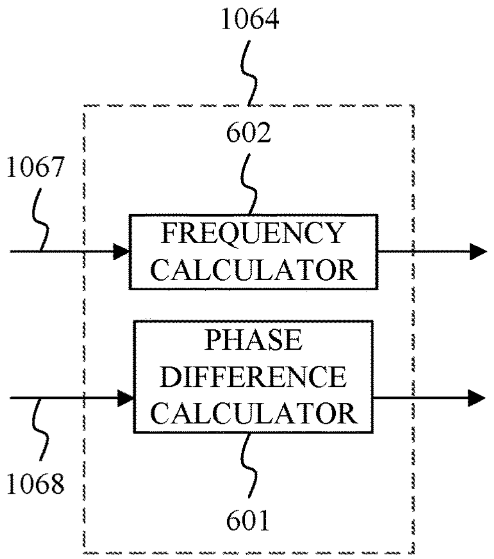
FIG. 11 is a block diagram of the control amount calculator in the fourth embodiment.

Referring now to FIG. 11, a description will be given of the control amount calculator 1064 according to this embodiment. FIG. 11 is a block diagram of the control amount calculator 1064 according to this embodiment. In this embodiment, the linear controller 1062 controls the frequency and the nonlinear controller 1063 controls the phase difference. The control amount calculator 1064 includes the phase difference calculator 601 and the frequency calculator 602. The frequency calculator 602 calculates the frequency (first control signal) of the driving signal based on the operation amount (first operation amount) 1067 calculated by the linear controller 1062.

The phase difference calculator 601 calculates the phase difference (second control signal) between driving signals based on the operation amount (second operation amount) 1068 calculated by the nonlinear controller 1063. The signal generator 1065 generates the driving signal based on the phase difference and the frequency calculated by the control amount calculator 1064. In this manner, the nonlinear controller 1063 controls the phase difference for each calculation period and dynamically performs the linearization correction for the frequency-speed characteristic. The linear controller 1062 linearly controls the frequency using the speed characteristic for which the linearization correction has been performed.

Figure 12:
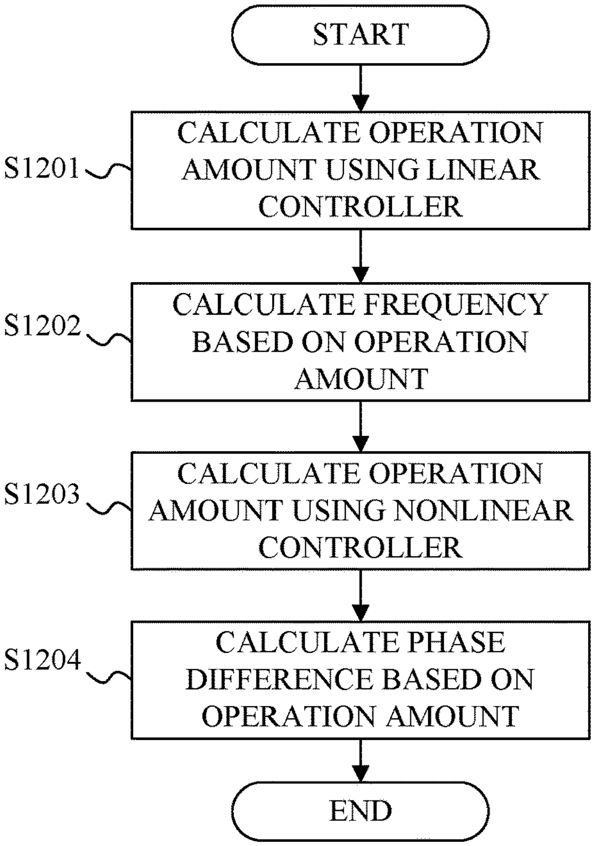
FIG. 12 is a flowchart illustrating control amount calculating processing in the fourth embodiment.

Referring now to FIG. 12, a description will be given of control amount calculating processing according to this embodiment. FIG. 12 is a flowchart illustrating the control amount calculating processing according to this embodiment. First, at step S1201, the linear controller 1062 calculates the operation amount 1067 based on the position deviation calculated by the subtractor 1066. Next, at step S1202, the frequency calculator 602 calculates the frequency based on the operation amount 1067 calculated at step S701 and outputs the calculated frequency as the control amount.

Next, at step S1203, the nonlinear controller 1063 calculates the operation amount 1068 for correcting nonlinear changes of the frequency-speed characteristic of the vibration actuator 110 based on the speed deviation. In a case where the speed characteristic is linear, the operation amount 1068 is zero and no correction is performed. Next, at step S1204, the phase difference calculator 601 calculates a phase difference correcting amount based on the operation amount 1068 calculated at step S1203. At initial control calculation of each driving, the phase difference calculator 601 outputs, as a control amount, a phase difference obtained by adding the calculated phase difference correcting amount to the previously set reference phase difference. In the second or subsequent control calculation, the phase difference calculator 601 outputs, as a control amount, a phase difference obtained by adding the calculated phase difference correcting amount to the previous phase difference. Then, the control amount calculation ends.

This is one cycle of the control amount calculating processing in this embodiment. As this processing is performed for each calculation period, linearization correction by phase difference control is dynamically performed, and thereby driving performance degradation in the linear control using the frequency control can be suppressed.

This embodiment controls the phase difference using the nonlinear controller 1063. As in the second or third embodiment, a threshold may be provided to the operation amount 1068 and processing may be performed through distribution into the phase difference and the duty ratio based on the relationship between the operation amount 1068 and the threshold. For example, in a case where the operation amount 1068 is larger than the threshold, a signal relating to the phase difference may be calculated based on the threshold, and a signal relating to the duty ratio may be calculated based on the operation amount obtained by subtracting the threshold from the operation amount 1068. Alternatively, for example, in a case where the operation amount 1068 is larger than the threshold, a signal relating to the duty ratio may be calculated based on the threshold, and a signal relating to the phase difference may be calculated based on an operation amount obtained by subtracting the threshold from the operation amount 1068.

This embodiment controls the frequency using the linear controller 1062, but may control the duty ratio. In this case, the nonlinear controller 1063 controls any or both of the phase difference or the frequency. In a case where the nonlinear controller 1063 controls both the phase difference and the frequency, a threshold may be provided to the operation amount 1068 to limit correction of either control amount.

Fifth Embodiment

A description will now be given of a fifth embodiment of this disclosure. A description will now be given of the lens control unit 106 configured to perform control of restraining driving performance degradation by dynamically correcting nonlinear speed characteristic changes that cannot be uniformly corrected due to individual differences, changes over time, environment changes, or orientation changes of an actuator that is controllable with a plurality of control inputs in each of the above embodiments. It is assumed that control by the linear controller 1062 tends to oscillate or the speed characteristic of the actuator significantly nonlinearly changes. This embodiment perform control of suppressing driving performance degradation by estimating a control state described above and by controlling a gain that determines the magnitude of an operation amount output from a controller.

Figure 13:
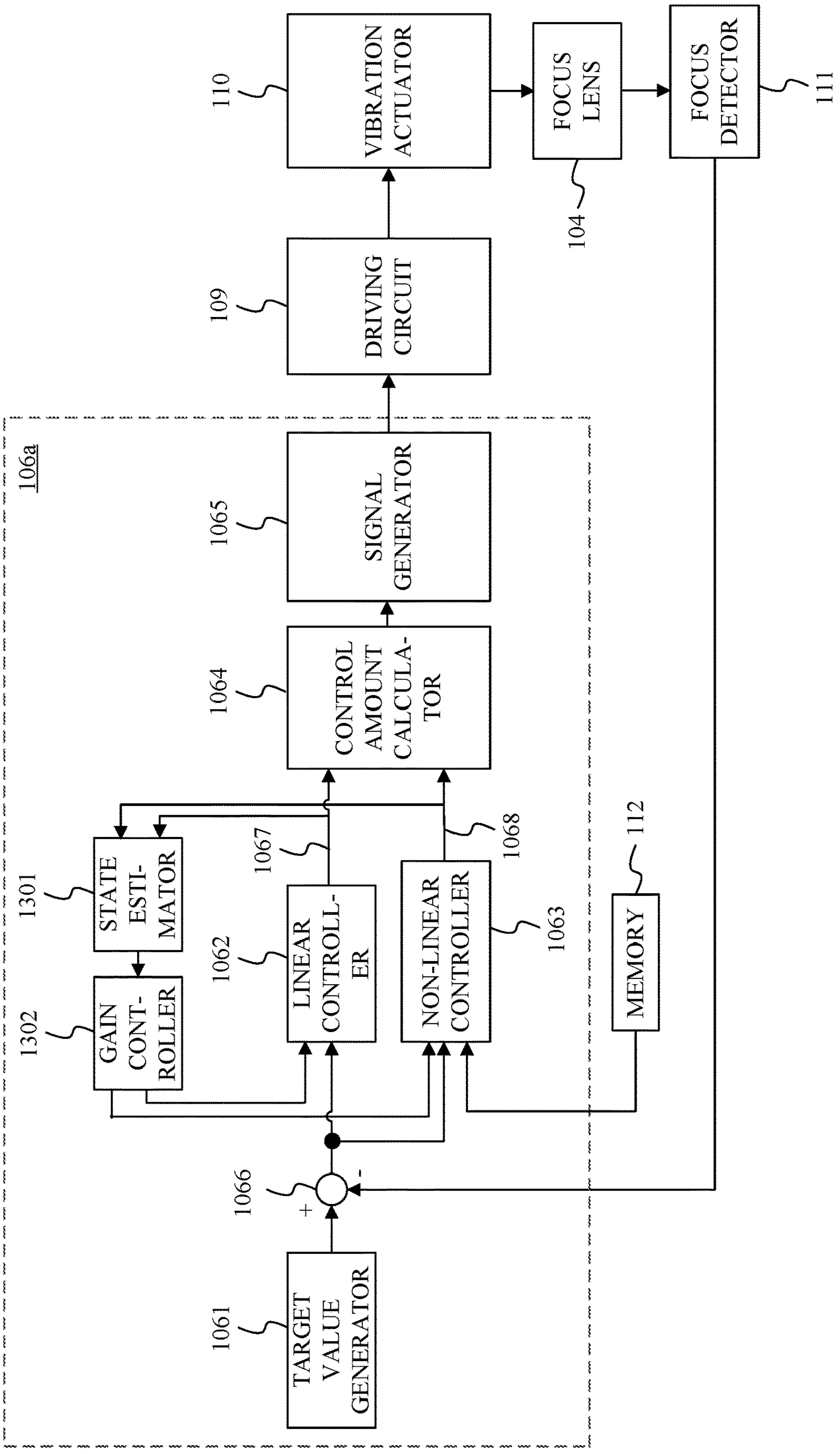
FIG. 13 is a block diagram of an actuator control apparatus in the fifth embodiment.

Referring now to FIG. 13, a description will be given of an actuator control apparatus according to this embodiment. FIG. 13 is a block diagram of the actuator control apparatus according to this embodiment. The actuator control apparatus in FIG. 13 is different from the actuator control apparatus in FIG. 3 in that a lens control unit 106*a* of an actuator controllable with a plurality of control inputs is provided in place of the lens control unit 106. The lens control unit 106*a* includes a state estimator (state estimating unit) 1301 and a gain controller (gain control unit) 1302 in addition to the elements of the lens control unit 106.

The state estimator 1301 temporally monitors at least one of the operation amount 1067 calculated by the linear controller 1062 and the operation amount 1068 output from the nonlinear controller 1063 and estimates a control state. The gain controller 1302 controls the gain of at least one of the linear controller 1062 and the nonlinear controller 1063 based on the estimation result by the state estimator 1301.

Figure 14:
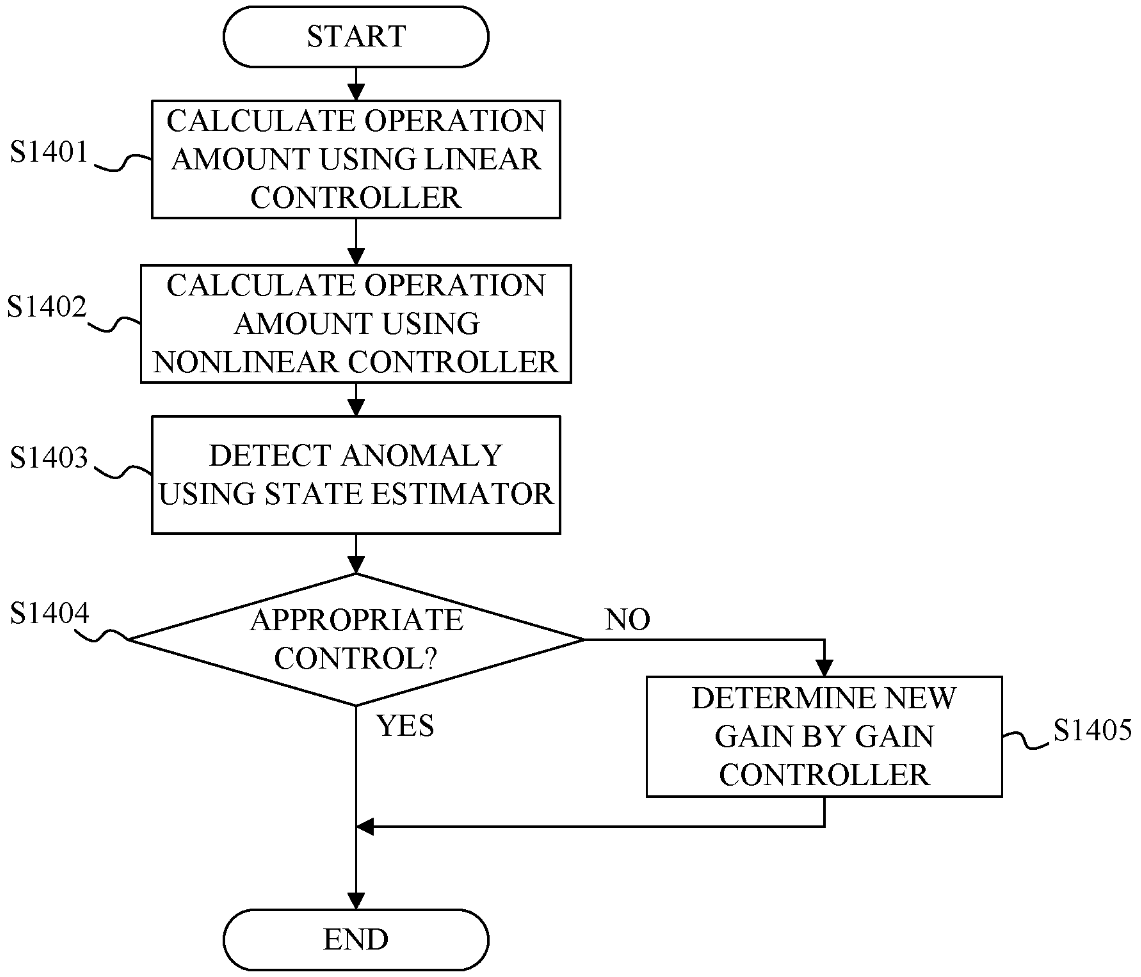
FIG. 14 is a flowchart illustrating state estimation and gain control processing in the fifth embodiment.

Referring now to FIG. 14, a description will be given of state estimation and gain control processing according to this embodiment. FIG. 14 is a flowchart illustrating the state estimation and gain control processing.

First, at step S1401, the linear controller 1062 calculates the operation amount 1067 for the linear control based on the position deviation. Next, at step S1402, the nonlinear controller 1063 calculates the operation amount 1068 for performing the linearization correction for the speed characteristic of the actuator based on the speed deviation.

Next, at step S1403, the state estimator 1301 temporally monitors the linear control operation amount 1067 calculated at step S1401 and the nonlinear control operation amount 1068 calculated at step S1402. Then, the state estimator 1301 estimates a control state based on a monitoring result and detects abnormality. For example, in a case where the operation amount 1068 calculated by the nonlinear controller 1063 frequently switches between positive and negative values, it is estimated that control by the linear controller 1062 tends to oscillate. For example, in a case where the operation amount 1068 calculated by the nonlinear controller 1063 does not converge and correction using a correction amount equal to or larger than a previously set value continues for a certain time or longer, it is estimated that the speed characteristic of the actuator significantly changes.

Next, at step S1404, the state estimator 1301 determines whether proper control is performed based on the estimation result at step S1403. In a case where it is determined that proper control is performed, this flow ends. In a case where it is determined that control has abnormality, the flow proceeds to step S1405.

At step S1405, the gain controller 1302 again controls the gain of any or both of the linear controller 1062 and the nonlinear controller 1063 based on the control state estimated at step S1403. For example, in a case where control by the linear controller 1062 tends to oscillate, the gain of the linear controller 1062 is decreased to stabilize control. In addition, for example, in a case where the speed characteristic of the actuator significantly changes, the gain of the nonlinear controller 1063 is increased to reduce a linearization correction time. Then, this flow ends. The above processing is repeated to again control the gain in a case where the control state is abnormal, and thereby control of suppressing driving performance degradation can be performed.

As described above, each embodiment performs dynamic correction for nonlinear characteristic changes that cannot be uniformly corrected due to individual differences, changes over time, environment changes, or orientation changes of an actuator controllable with a plurality of control inputs. Thus, each embodiment can provide a control apparatus, an optical apparatus, and a control method, each of which can suppress driving performance degradation due to nonlinear characteristic changes of the actuator.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2023-072088, which was filed on Apr. 26, 2023, and which is hereby incorporated by reference herein in its entirety.

What is claimed is:

1. A control apparatus comprising:

a memory storing instructions; and a processor configured to execute the instructions to:

perform linear control to output a first operation amount based on first information including position information and speed information about the actuator detected by a detector, perform nonlinear control to output a second operation amount different from the first operation amount based on the first information, and output a first control signal for the actuator based on the first operation amount, and a second control signal for the actuator based on the second operation amount, wherein the processor is configured to output the second operation amount such that a phase difference-speed characteristic of the actuator approaches a linear characteristic.

2. The control apparatus according to claim 1, wherein the processor is configured to dynamically output the second operation amount for each calculation period.

3. The control apparatus according to claim 1, wherein the actuator is a brushless DC motor.

4. The control apparatus according to claim 1, wherein the processor is configured to:

estimate a state of control based on at least one of the first operation amount and the second operation amount, and control a gain of at least one of the linear control and the nonlinear control based on a result of the estimation.

5. The control apparatus according to claim 1, wherein the second operation amount for each calculation period of the nonlinear control is limited to a predetermined amount.

6. An optical apparatus comprising:

the control apparatus according to claim 1; and an optical member driven by the actuator.

7. The control apparatus according to claim 1, wherein the actuator is a vibration actuator configured to move a vibration body and a contact body in contact with the vibration body relative to each other, the vibration body being configured to excite vibration upon application of a first frequency signal and a second frequency signal having a phase difference.

8. The control apparatus according to claim 7, wherein the first control signal is a signal relating to at least one of a phase difference, a frequency, and a duty ratio, and wherein the second control signal is a signal relating to at least another one of the phase difference, the frequency, and the duty ratio.

9. The control apparatus according to claim 8, wherein the processor is configured to:

calculate a signal relating to the phase difference based on the first operation amount, and calculate a signal relating to at least one of the frequency and the duty ratio based on the second operation amount.

10. The control apparatus according to claim 9, wherein the processor is configured to:

calculate a signal relating to the frequency based on the second operation amount in a case where the second operation amount is smaller than a threshold, and calculate the signal relating to the frequency based on the threshold and a signal relating to the duty ratio based on an operation amount obtained by subtracting the threshold from the second operation amount, in a case where the second operation amount is larger than the threshold.

11. The control apparatus according to claim 9, wherein the processor is configured to:

calculate a signal relating to the duty ratio based on the second operation amount in a case where the second operation amount is smaller than a threshold, and calculate the signal relating to the duty ratio based on the threshold and a signal relating to the frequency based on an operation amount obtained by subtracting the threshold from the second operation amount, in a case where the second operation amount is larger than the threshold.

12. The control apparatus according to claim 8, wherein the processor is configured to:

calculate a signal relating to the frequency based on the first operation amount, and calculate a signal relating to at least one of the phase difference and the duty ratio based on the second operation amount.

13. The control apparatus according to claim 12, wherein the processor is configured to:

calculate a signal relating to the phase difference based on the second operation amount in a case where the second operation amount is smaller than a threshold, and calculate the signal relating to the phase difference based on the threshold and a signal relating to the duty ratio based on an operation amount obtained by subtracting the threshold from the second operation amount, in a case where the second operation amount is larger than the threshold.

14. The control apparatus according to claim 12, wherein the processor is configured to:

calculate a signal relating to the duty ratio based on the second operation amount in a case where the second operation amount is smaller than a threshold, and calculate the signal relating to the duty ratio based on the threshold and a signal relating to the phase difference based on an operation amount obtained by subtracting the threshold from the second operation amount, in a case where the second operation amount is larger than the threshold.

15. The control apparatus according to claim 8, wherein the processor is configured to:

calculate a signal relating to the duty ratio based on the first operation amount, and calculate a signal relating to at least one of the phase difference and the frequency based on the second operation amount.

16. The control apparatus according to claim 15, wherein the processor is configured to:

calculate a signal relating to the phase difference based on the second operation amount in a case where the second operation amount is smaller than a threshold, and calculate the signal relating to the phase difference based on the threshold and a signal relating to the frequency based on an operation amount obtained by subtracting the threshold from the second operation amount, in a case where the second operation amount is larger than the threshold.

17. The control apparatus according to claim 15, wherein the processor is configured to:

calculate a signal relating to the frequency based on the second operation amount in a case where the second operation amount is smaller than a threshold, and calculate the signal relating to the frequency based on the threshold and a signal relating to the phase difference based on an operation amount obtained by subtracting the threshold from the second operation amount, in a case where the second operation amount is larger than the threshold.

18. A control method comprising the steps of:

outputting a first operation amount based on a first information including position information and speed information about the actuator detected by a detector;

outputting a second operation amount different from the first operation amount based on the first information;

outputting a first control signal for the actuator based on the first operation amount, and a second control signal for the actuator based on the second operation amount; and outputting the second operation amount such that a phase difference-speed characteristic of the actuator approaches a linear characteristic.

19. A non-transitory computer-readable medium storing a computer program that causes a computer to execute the control method according to claim 18.

20. A control apparatus configured to control an actuator with a plurality of control signals, the control apparatus comprising:

a memory storing instructions; and a processor configured to execute the instructions to:

perform linear control to output a first operation amount based on a first information of the actuator detected by a detector, perform nonlinear control to output a second operation amount based on the first information, and output the plurality of control signals based on the first operation amount and the second operation amount, wherein the processor is configured to:

calculate a signal relating to one of a phase difference or a frequency based on the first operation amount, and in a case where the second operation amount is smaller than a threshold, calculate a signal relating to one of a duty ratio or the other of the phase difference or the frequency based on the second operation amount, and in a case where the second operation amount is larger than the threshold, calculate the signal relating to one of the duty ratio or the other of the phase difference or the frequency based on the threshold, and calculate a signal relating to the other of the duty ratio or the other of the phase difference or the frequency based on the threshold based on an operation amount obtained by subtracting the threshold from the second operation amount.

* * * * *